Nov. 9, 1954 W. S. DRUZ 2,694,104

SUBSCRIBER TELEVISION SYSTEM

Filed Nov. 13, 1950 6 Sheets-Sheet 1

INVENTOR.
WALTER S. DRUZ
BY Francis W. Crotty
HIS ATTORNEY

INVENTOR.
WALTER S. DRUZ.
BY Francis W. Crotty
HIS ATTORNEY

INVENTOR.
WALTER S. DRUZ.
BY Francis W. Crotty
HIS ATTORNEY

INVENTOR.
WALTER S. DRUZ
BY Francis W. Crotty
HIS ATTORNEY

INVENTOR.
WALTER S. DRUZ.
BY Francis W. Crotty
HIS ATTORNEY

INVENTOR.
WALTER S. DRUZ
BY Francis W. Crotty
HIS ATTORNEY 2,694,104

SUBSCRIBER TELEVISION SYSTEM

Walter S. Druz, Chicago, Ill., assignor to Zenith Radio Corporation, a corporation of Illinois Application November 13, 1950, Serial No. 195,240

3 Claims. (Cl. 178—5.1)

Figure 1:
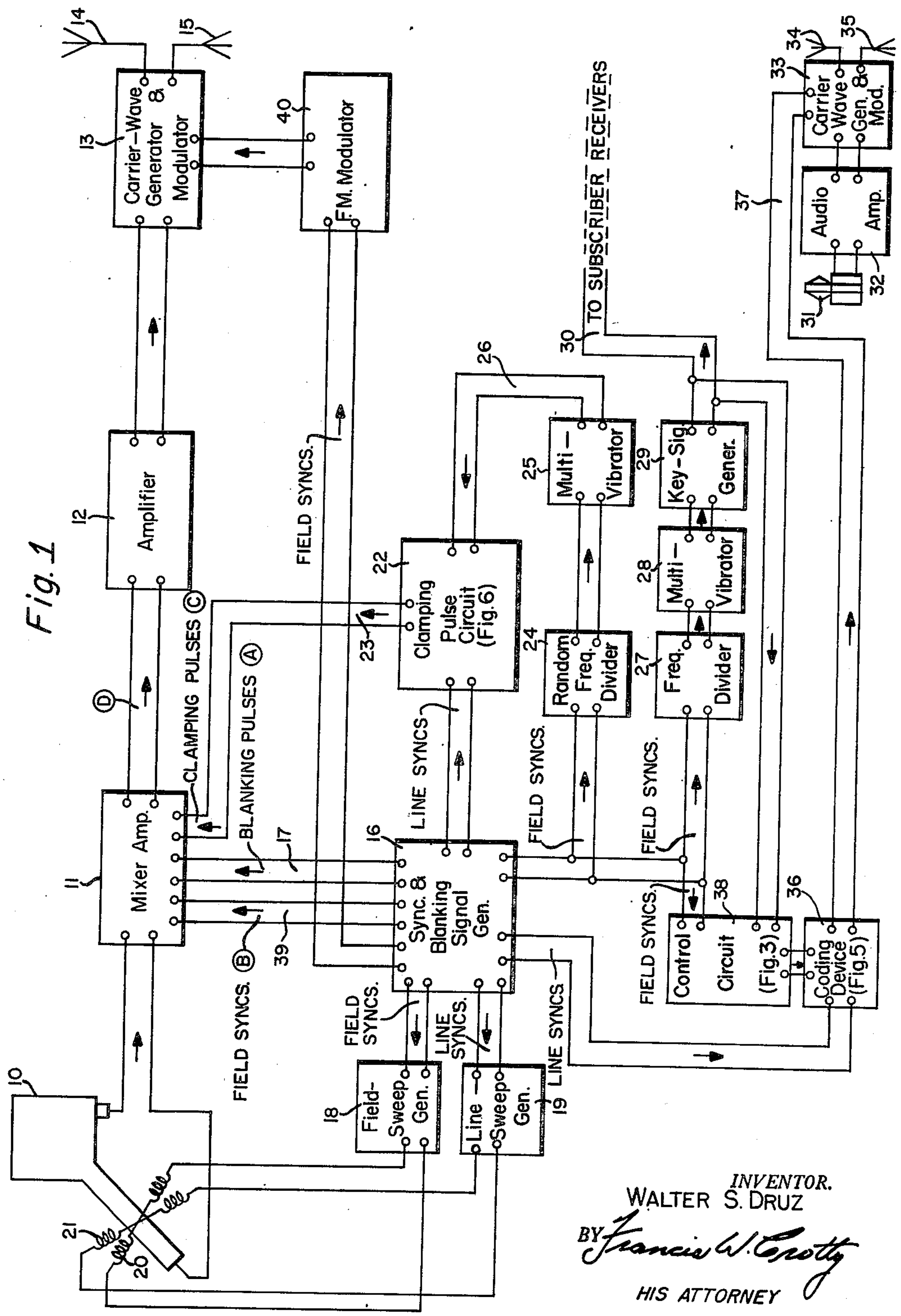

This invention relates to television signalling systems of the subscription type, and more particularly to such systems in which a television signal is transmitted in coded or scrambled form and a key signal for decoding the coded television signal is concurrently transmitted to subscriber receivers.

Subscription television systems of the above-mentioned type are disclosed in Patent No. 2,510,046, May 30, 1950, Ellett et al., entitled "Radio-Wire Signalling Systems" and in Patent No. 2,547,598, April 3, 1951, Roschke, entitled "Image Transmission System," both assigned to the present assignee. The system of this invention is characterized by the fact that the television signal is coded to an exceedingly high degree of complexity so that it is most difficult for unauthorized receivers to decode and utilize the signal. Moreover, in accordance with the invention, the coding function does not affect the scanning process of the video-frequency signal generator of the transmitter and may, therefore, be accomplished at a point remote from the origin of the television signal. For example, a television signal representing a certain program may originate in one locality and may be transmitted in uncoded form over a coaxial cable, micro-wave link or by other means to another locality where the coding apparatus of the invention may be positioned and utilized to retransmit that signal in coded form to the suronding area.

The transmitter of the invention includes a video-signal source which may be a pick-up device of the iconoscope, image orthicon, flying spot scanner or any other type. The video signal derived from this source is amplitude-modulated on a picture carrier and transmitted to subscriber receivers. The field-synchronizing components of the television signal, which, in accordance with the present-day standards, have a frequency of 60 cycles, are frequency-modulated on the picture carrier. The line-synchronizing components which by present-day standards have a frequency of 15,750 cycles, are coded by altering some characteristic thereof, in a manner to be described, and are transmitted to subscriber receivers concurrently with the sound-signal components on a sound carrier. Line- and field-blanking pulses are also transmitted on the picture carrier with the video components, but the amplitude of the line-blanking pulses is established at a lower level than the maximum amplitude of the video components so that unauthorized synchronization on these pulses is precluded. To enable subscriber receivers to reinsert the direct-current and low-frequency video components, which are usually lost in alternating-current coupling circuits at the receivers, clamping pulses are also transmitted superposed on the line-blanking pulses. The timing of the clamping pulses is altered, preferably at an entirely random rate, to prevent unauthorized synchronization thereon. A key signal, indicating the coding schedule of the line-synchronizing components, is transmitted to subscriber receivers over a separate channel, for example, over a line circuit.

It is, accordingly, an object of this invention to provide an improved subscription type of television system in which a television signal is coded with such a high degree of complexity that unauthorized reception thereof is rendered impossible for all practical purposes.

A further object of the invention is to provide an improved subscription signalling system in which a coded television signal is transmitted over a first signal channel, and a key signal indicating the coding schedule of the television signal is transmitted to subscriber receivers over a second signal channel.

Figures 2, 5:
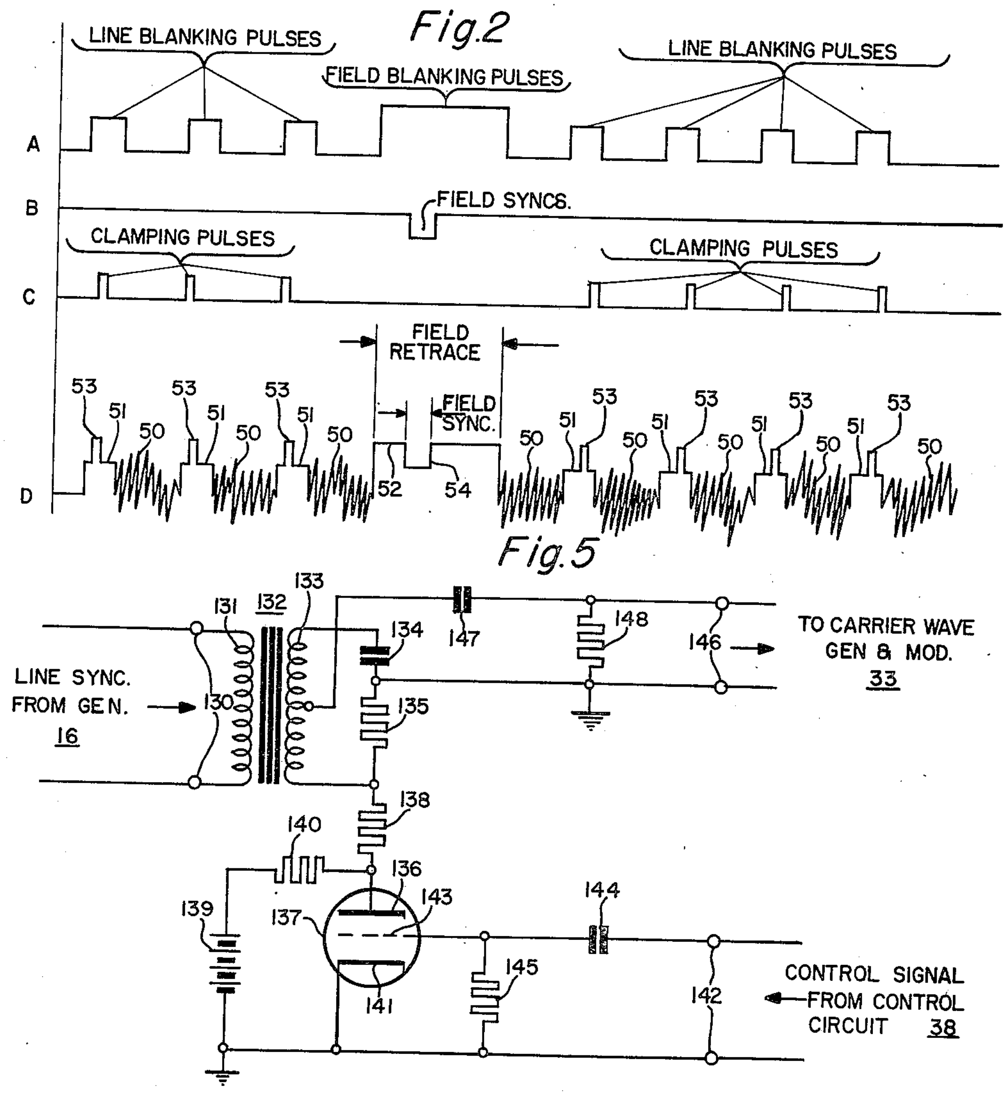
Figure 3:
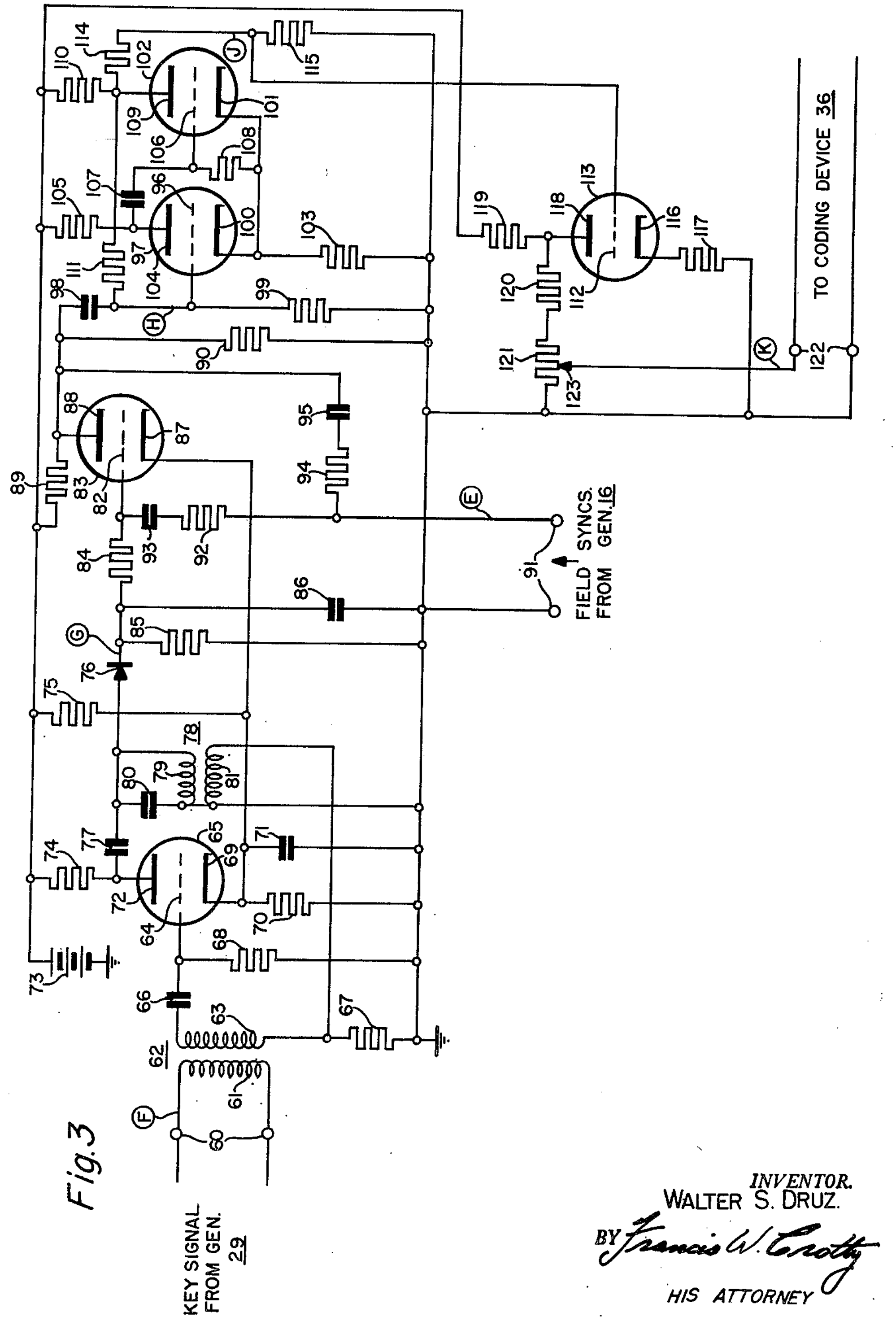
Figure 4:
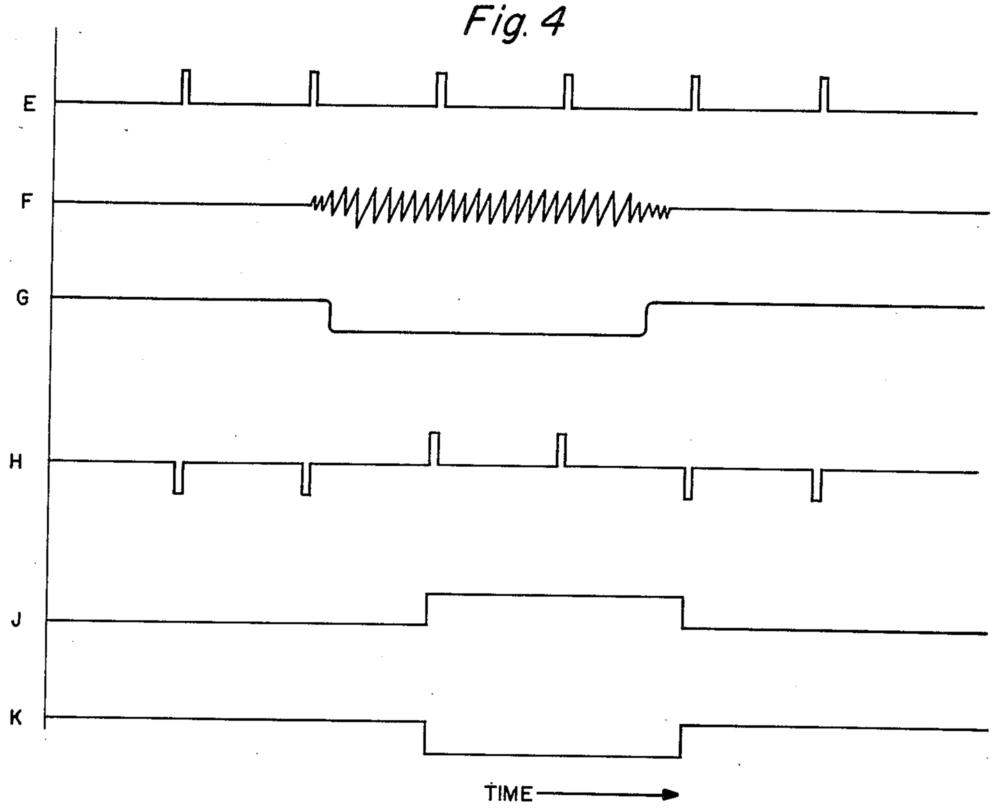
Figures 6, 7:
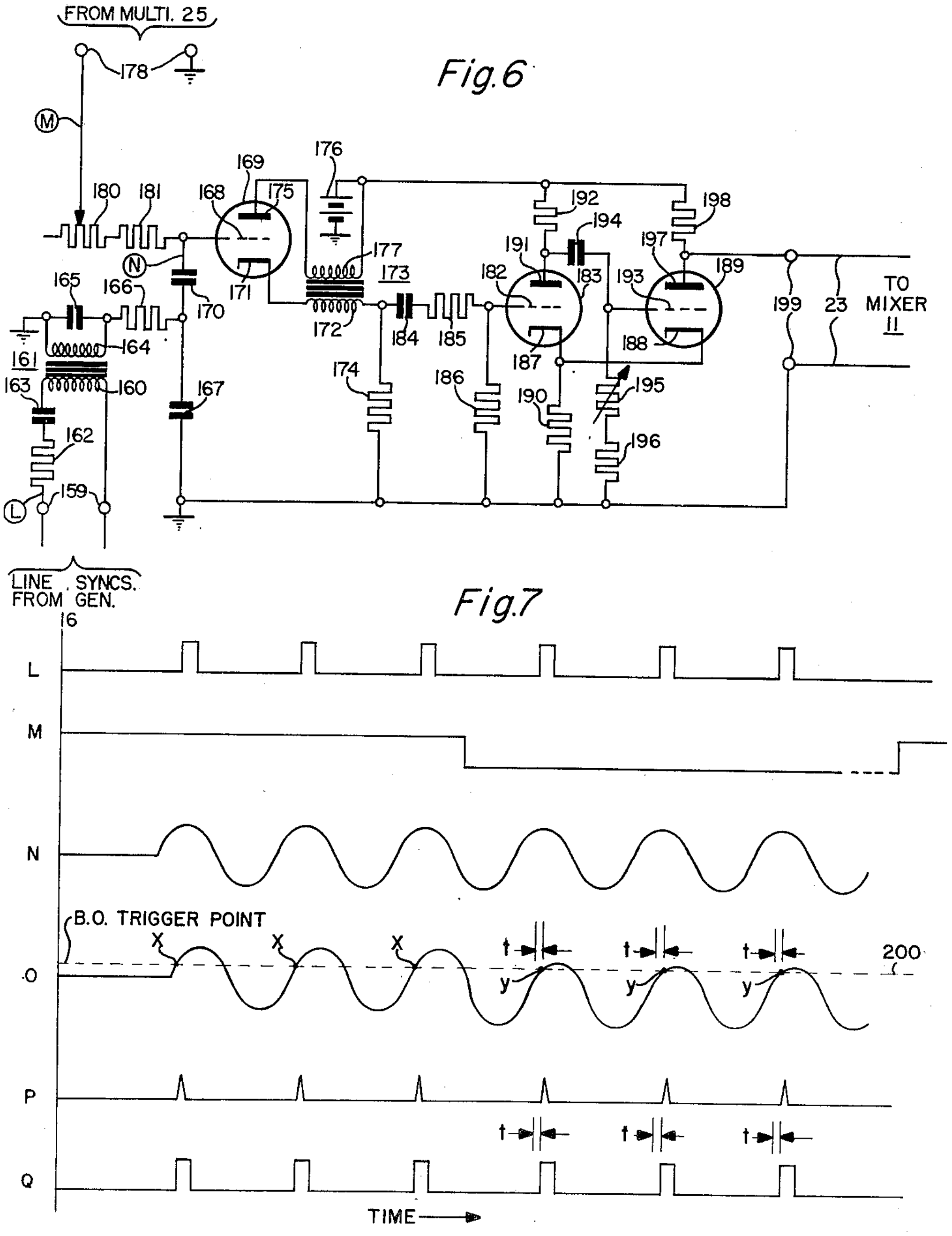
Figure 8:
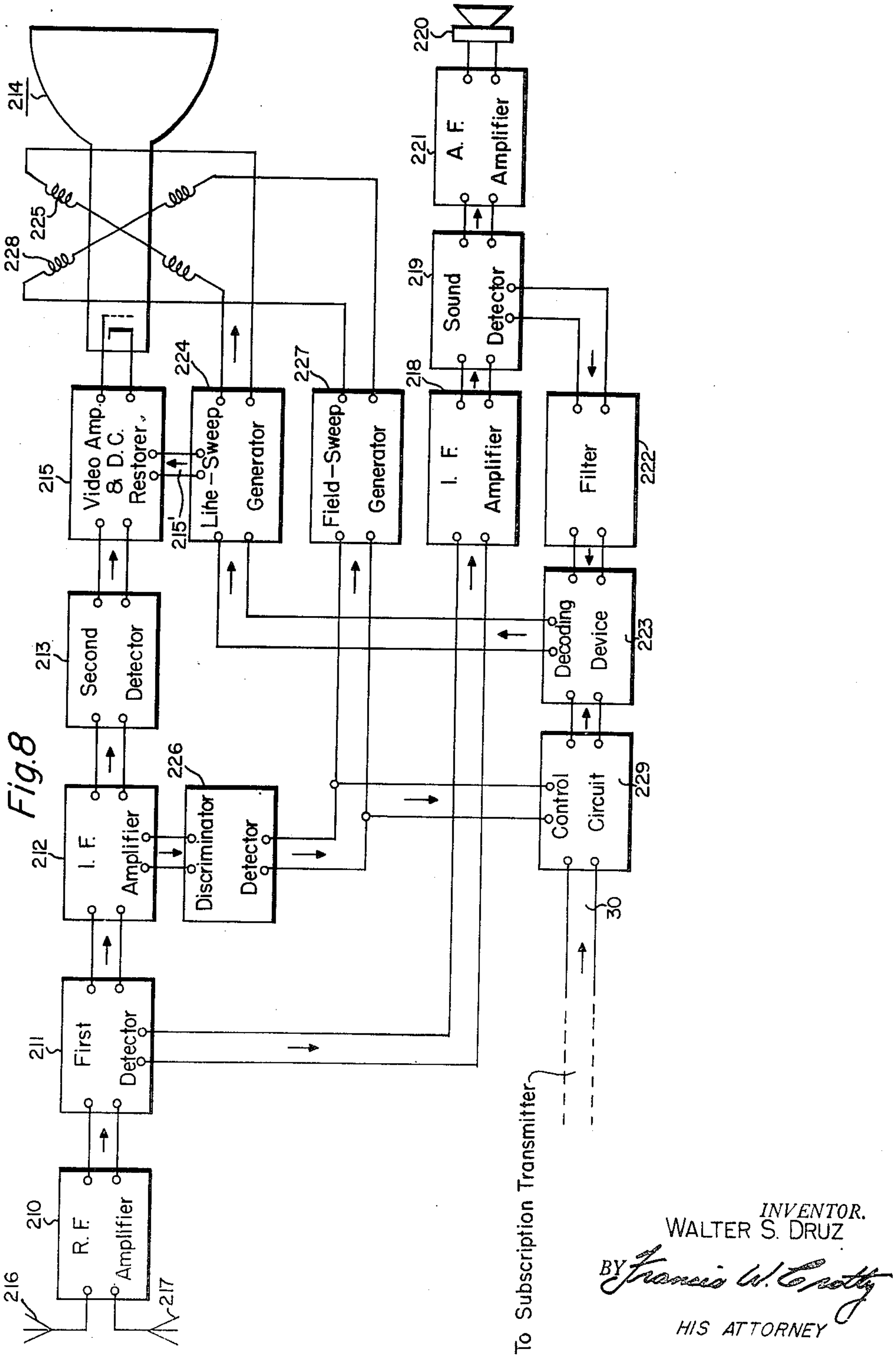

The features of this invention which are believed to be new are set forth with particularity in the appended claims. The invention itself, however, together with further objects and advantages thereof may best be understood by reference to the following description when taken in conjunction with the accompanying drawings, in which:

Figure 1 represents a transmitter constructed in accordance with the invention,

Figure 2 represents certain wave forms indicating the operation of the transmitter, Figure 3 is a detailed diagram of one of the components of the transmitter, Figure 4 shows various curves useful in explaining the operation of the circuit of Figure 3, Figure 5 represents a detailed diagram of another of the components of the transmitter, this component being expressly disclosed and claimed in copending application Serial No. 163,223, filed May 20, 1950, and issued March 23, 1954, as Patent 2,673,238, in the name of Walter S. Druz, entitled "Timing System for Subscription Type Television Receiver" and assigned to the present assignee;

Figure 6 represents a detailed diagram of yet another component of the transmitter, Figure 7 comprises various curves useful in understanding the operation of the circuit of Figure 6, and Figure 8 shows a receiver constructed in accordance with the invention.

Refering now particularly to Figure 1, the subscription television transmitter illustrated therein includes a video-signal generator 10 of the iconoscope, image orthicon or other suitable type, and which operates in any well-known manner to produce a video signal representing a scanned subject. The device 10 is connected to a mixer amplifier 11 having output terminals connected to a further amplifier 12 which, in turn, is coupled to a carrier-wave generator and amplitude modulator 13. The output terminals of the latter are connected to a suitable antenna circuit 14, 15. The transmitter also includes a generator 16 for producing field- and line-synchronizing pulses and associated blanking pulses. Unit 16 is connected to mixer amplifier 11 by way of leads 17 and supplies thereto the line- and field-blanking pulses, shown in curve A of Figure 2. The line-blanking pulses have an amplitude corresponding substantially to the average amplitude, or "gray" level, of the video signal output of device 10, while the field-blanking pulses have an amplitude corresponding to the maximum, or "black," level of the video signal. Unit 16 is also connected to a field-sweep generator 18 and supplies field-synchronizing pulses thereto to control or time its operation, and is further connected to a line-sweep generator 19 to supply line-synchronizing pulses to this latter generator to control its operation. The output terminals of generators 18 and 19 are connected respectively to the field- and line-deflection elements 20, 21 of device 10.

Unit 16 is also connected to a clamping-pulse circuit 22, to be described in detail hereinafter, and supplies line-synchronizing pulses to this circuit. The clamping-pulse circuit is connected to mixer amplifier 11 by way of leads 23 and supplies clamping pulses thereto as shown in curve C of Figure 2. Unit 16 is additionally connected to a frequency divider 24 and supplies field-synchronizing pulses thereto. The frequency divider 24 may be of a random type such as disclosed in copending application Serial No. 32,457, Roschke, filed June 11, 1948, issued March 11, 1952, as Patent 2,588,413, entitled "Random Frequency Divider," and assigned to the present assignee. The output terminals of frequency divider 24 are connected to a multivibrator 25 of the well-known "Eccles-Jordan" type. The multivibrator has two stable operating conditions and is triggered between these operating conditions by each frequency-divided pulse from divider 24. The multivibrator is connected to clamping-pulse circuit 22 by way of leads 26.

Unit 16 also supplies field-synchronizing pulses to a frequency divider 27, the output terminals of which are connected to a multivibrator 28. Frequency divider 27 may, likewise, be of the random type such as disclosed in above-mentioned Patent 2,588,413; and multivibrator 28 is also of the "Eccles-Jordan" type. Multivibrator 28 is connected to a key-signal generator 29, and causes this generator to generate a key signal of a preselected frequency during intervals when the multivibrator is in a selected one of its two operating conditions. The output terminals of key-signal generator 29 are connected to a line circuit 30 which extends to the various subscriber receivers.

The transmitter further includes a sound-translating device 31 for producing a sound signal in response to the sound information accompanying the televised picture. Translating device 31 is connected to an audio-frequency amplifier 32 which, in turn, is connected to a carrier-wave generator and modulator 33. In accordance with present-day standards, the amplified sound signal is frequency modulated on a sound carrier in unit 33 and radiated by an antenna circuit 34, 35.

Unit 16 is further connected to a coding device 36 and supplies line-synchronizing signals thereto. The output terminals of coding device 36 are connected to unit 33 by means of leads 37 so that the coded line-synchronizing signal may be modulated on the sound carrier together with the sound signal. Coding device 36 is actuated by a control circuit 38 having a first pair of input terminals connected to unit 16 to derive field-synchronizing pulses therefrom, and having a second pair of input terminals connected to line circuit 30 to derive the key signal from generator 29. Coding device 36 and control circuit 38 are to be described in detail hereinafter.

Generating unit 16 is connected to mixer amplifier 11 by way of leads 39 to supply field-synchronizing pulses thereto as shown in curve B of Figure 2. The unit is also connected to a frequency modulator stage 40 which, in turn, is connected to carrier-wave generator 13. Unit 16 supplies field-synchronizing pulses to modulator 40 so that the picture carrier wave generated in unit 13 may be frequency modulated in accordance with the field-synchronizing pulses.

The desired video signal is generated by device 10 during a series of trace intervals separated by retrace intervals and is delivered to mixer amplifier 11 wherein it is mixed with line- and field-blanking pulses from generator 16 which are timed to occur during the line and field retrace intervals to produce a form of composite television signal. The amplitude of the line-blanking components of the resulting television signal is substantially equal to the average amplitude of the video components to prevent unauthorized synchronization thereon. At the same time, circuit 22 supplies clamping pulses over leads 23 to mixer amplifier 11 for inclusion in the composite signal. The clamping pulses are timed to appear pedestalled on the line-blanking pulses and the amplitude of the clamping pulses is so adjusted that the combined clamping and line-blanking pulses have a peak amplitude corresponding to the "black" level of the composite signal. The amplitude of the field-blanking pulses also corresponds to the black level of the composite signal.

Unit 16 additionally supplies field-synchronizing pulses to mixer 11, these pulses occurring within the blanking pulses and having such a polarity and amplitude that they appear as an inward modulation of the field-blanking pulses, as shown in curve D, of Figure 2. The composite signal developed from the various components supplied to amplifier 11 has the wave form shown in curve D and is amplified in amplifiers 11 and 12. This composite signal is amplitude-modulated on the picture carrier in unit 13 and radiated by antenna circuit 14, 15, the field-synchronizing components being frequency-modulated on the carrier by unit 40.

Examination of curve D reveals that the composite signal includes video components 50, line-blanking pulses 51, field-blanking pulses 52, and clamping pulses 53 pedestalled on the line-blanking pulses. The composite signal also includes a field-synchronizing pulse 54 pedestalled with inverted polarity on each field-blanking pulse. The field-synchronizing pulses 54 are included in the composite signal to compensate for the effect of frequency shift of the picture carrier during the occurrence of each field-synchronizing pulse frequency-modulated on the picture carrier. In usual vestigal-side band reception, if the pulse 54 were not included on each field-blanking pulse 52, a sharp rise would occur in the amplitude of the field-blanking pulse due to the frequency shift of the carrier. This would affect the operation of the receiver apparatus which reinserts the low-frequency components of the video signal, and give rise to distortion in the reproduced image. The inclusion of pulse 54 on each of the field-blanking pulses eliminates such distortion, since this pulse is given an appropriate amplitude so that the frequency shift of the carrier causes a rise in amplitude merely to the peak level of the field-blanking pulses.

The line-synchronizing signal from unit 16 is supplied to coding device 36, and after being coded in a manner to be described, is applied to unit 33 for modulation on the sound carrier, as previously mentioned.

To prevent unauthorized receivers from deriving synchronizing information from the clamping pulse components of the television signal, the timing of the clamping pulses as delivered to mixer amplifier 11 by clamping circuit 22 is changed (in a manner to be described) and in accordance with a random coding schedule developed by units 24, 25.

The key-signal generator 29 is triggered (in a manner to be described) by units 27, 28 to generate bursts of key signal representing the coding schedule of the line-synchronizing components for transmission to subscriber receivers over line circuit 30. The bursts of key signal are also supplied to control circuit 38 to cause the control circuit and coding device 36 to be actuated during spaced intervals determined by that schedule.

The operation of control circuit 38 is such that whenever key-signal generator 29 generates a burst of key signal on line circuit 30, the control circuit acts during the field-retrace intervals following the initiation and termination of such bursts to actuate the coding device 36. Therefore, coding device 36 is controlled to impart characteristic variations to the line-synchronizing components during field-retrace intervals and any distortion that might otherwise occur in the image reproduced by the subscriber receivers should such variations take place during trace intervals is precluded. Moreover, the key-signal generator is actuated to initiate and terminate each burst of key signal by the frequency-divided field-synchronizing pulses from divider 27, wherefore, each burst of key signal originates and terminates during a field-retrace interval. However, due to the action of control circuit 38, no change takes place in the line-synchronizing components until the field-retrace intervals succeeding such initiation and termination. Because of this, and in a manner to be described, each burst of key signal precedes the corresponding characteristic variation in the line-synchronizing components by an interval corresponding to at least a portion of a field-trace interval. Accordingly, slight time delays that might be imparted to the key-signal bursts in line circuit 30 do not affect the proper operation of the subscriber receivers, and decoding apparatus at such receivers operates in time coincidence with coding changes of the line-synchronizing components at the transmitter despite such delays.

Control circuit 38, shown in detail in Figure 3, and disclosed and claimed in copending application Serial No. 341,681 filed March 11, 1953, in the name of Pierce E. Reeves, includes a pair of input terminals 60 connected to key-signal generator 29. Terminals 60 are further connected to the primary winding 61 of a transformer 62 having a secondary winding 63 coupled to the control electrode 64 of an electron-discharge device 65 through a coupling capacitor 66 and to ground through a resistor 67. Control electrode 64 is connected to ground through a grid-leak resistor 68 and the cathode 69 is grounded through a resistor 70 shunted by a capacitor 71. Anode 72 of device 65 is connected to the positive terminal of a source of unidirectional potential 73 through a load resistor 74, and cathode 69 is connected to this terminal through a resistor 75. Device 65 is an amplifier for amplifying the key signal received from generator 29, but in view of the cathode bias provided by the potentiometer arrangement of resistors 70, 75 it responds only when the amplitude of the key signal exceeds a preselected value.

Anode 72 is coupled to a rectifier 76 through a coupling capacitor 77. The amplifier is made regenerative by means of a transformer 78 comprising a primary winding 79 having one side directly connected to the junction of capacitor 77 and rectifier 76, and its other side coupled to this junction through a capacitor 80. The secondary winding 81 of the transformer has one side connected to the primary winding and to ground, and its other side connected to the junction of winding 63 and resistor 67. Rectifier 76 is connected to the control electrode 82 of an electron-discharge device 83 through a resistor 84, and to ground through a resistor 85 shunted by a capacitor 86. The cathode 87 of device 83 is directly connected to cathode 69 of device 65, and anode 88 of device 83 is connected to the positive terminal of source 73 through a load resistor 89 and to ground through a resistor 90.

The control circuit has a second pair of input terminals 91 which are connected to unit 16. One of the terminals 91 is connected to ground and the other is coupled to control electrode 82 of device 83 through series-connected resistor 92 and capacitor 93. The ungrounded terminal 91 is also coupled to anode 88 of device 83 through series-connected resistor 94 and capacitor 95.

Anode 88 is coupled to the control electrode 96 of an electron-discharge device 97 through a capacitor 98, the control electrode being connected to ground through a grid-leak resistor 99. The cathode 100 of device 97 is directly connected to cathode 101 of an electron-discharge device 102, and these cathodes are grounded through a common resistor 103. The anode 104 of device 97 is connected to the positive terminal of source 73 through a resistor 105, and is coupled to the control electrode 106 of device 102 through a capacitor 107, the control electrode being connected to cathodes 100, 101 through a resistor 108. The anode 109 of device 102 is connected to the positive terminal of source 73 through a resistor 110 and to control electrode 96 of the device 97 through a resistor 111. Devices 97 and 102 are connected to form a "single shot" multivibrator, and may be triggered from one operating condition to another by pulses of one polarity and returned to the first operating condition by pulses of a second polarity. The construction and operation of this type of multivibrator circuit are well-known in the art.

Anode 109 of device 102 is further connected to the control electrode 112 of an electron-discharge device 113 through a limiting resistor 114, the control electrode being connected to ground through a resistor 115. The cathode 116 of device 113 is connected to ground through a resistor 117, and its anode 118 is connected to the positive terminal of source 73 through a resistor 119. Anode 118 is connected to ground through series-connected resistors 120 and 121. The device 113 is a phase inverter for inverting the polarity of the output pulses obtained from the preceding multivibrator and for supplying them to output terminals 122 with an amplitude that may be adjusted by variation of a movable tap 123 on resistor 121. The output terminals 122 are connected to coding device 36 of Figure 1.

The operation of the circuit of Figure 3 may best be understood by reference to the various wave forms of Figure 4. Field-synchronizing pulses from generator 16 are impressed across terminals 91 and have a wave form shown in curve E. These pulses are supplied to control electrode 82 of device 83 through network 92, 93 and to the junction of anode 88 and resistor 90 through network 94, 95. The bursts of key signal generated by key-signal generator 29 are impressed across terminals 60, and each burst has a wave form as shown in curve F. The key-signal bursts are amplified in amplifier 65, rectified by device 76 and supplied to control electrode 82 with the wave form shown in curve G. When the rectified signal of curve G has its maximum negative amplitude, device 83 is rendered non-conductive.

During the intervals between bursts of key signal, the field-synchronizing pulses are amplified by device 83 and are applied to control electrode 96 of device 97 with negative polarity. In addition, the field-synchronizing pulses are applied directly to control electrode 96 by way of network 94, 95 but with positive polarity. The amplification of device 83 is, preferably, made such that under these conditions the resultant pulses applied to control electrode 96 have negative polarity. However, during the occurrence of each burst of key signal, and when the rectified signal of curve G has its maximum negative value, the field-synchronizing pulses are supplied to control electrode 96 only by way of network 94, 95 and with positive polarity. As shown in curve H, the pulses supplied to control electrode 96 are of negative polarity until the occurrence of each burst of key signal, at which time the next succeeding field pulses are of positive polarity. The field-synchronizing pulses applied to control electrode 96 following the termination of each key-signal burst again have negative polarity.

The multivibrator circuit of devices 97, 102 is triggered from one operating condition in which device 97 is non-conductive and device 102 conductive, to the other wherein device 97 is conductive and device 102 non-conductive by the first positive-polarity field-synchronizing pulse succeeding the initiation of each key-signal burst and is returned to its first operating condition by the first field-synchronizing pulse following the termination of each such burst. The multivibrator, therefore, supplied a signal to control electrode 112 of device 113 having a positive pulse component determined by the key-signal burst, as shown in curve J. Device 113 inverts the phase of this signal and supplies a signal having negative-polarity pulse components, shown in curve K, to output terminals 122 each time the multivibrator is triggered to its second operating condition and then returned to its first operating condition. The output signal is applied to coding device 36 to actuate this device in a manner to be described.

The coding device 36, shown in detail in Figure 5, includes a pair of input terminals 130 connected to unit 16 to derive the line-synchronizing signal therefrom, which preferably has the form of a sine wave. Terminals 130 are connected to the primary winding 131 of a transformer 132. Secondary winding 133 of the transformer is shunted by a capacitor 134 series-connected with a resistor 135, the junction of capacitor 134 and resistor 135 being connected to ground. The junction of resistor 135 and winding 133 is connected to the anode 136 of an electron-discharge device 137 through a resistor 138, and the junction of resistor 138 and anode 136 is connected to the positive terminal of a source of unidirectional potential 139 through a resistor 140. The cathode 141 of device 137 is grounded, as is the negative terminal of source 139. The coding device also includes a pair of input terminals 142 which are connected to the output terminals of control circuit 38. One of the terminals 142 is grounded and the other is coupled to the control electrode 143 of device 137 through a coupling capacitor 144, the control electrode being connected to ground through a grid-leak resistor 145. The output terminals 146 of the coding circuit are connected to sound modulator unit 33. One of the terminals 146 is grounded and the other is coupled to a center tap on winding 133 through a capacitor 147, the junction of terminal 146 and capacitor 147 being connected to ground through a resistor 148.

As previously described in conjunction with Figure 3 and as shown in curve K of Figure 4, control circuit 38 generates a signal having a negative-polarity pulse component occurring at random times and initiated and terminated during field-retrace intervals succeeding the initiation and termination of each key-signal burst on line circuit 30. The coding device is so adjusted that, during the intervals between the negative-polarity pulse components of the signal from control circuit 38, device 137 is conductive. For this condition, the line-synchronizing sine-wave signal from generator 16 applied to winding 131 is phase shifted by an amount determined by network 134, 135 and 138. Therefore, the sine-wave output signal obtained across terminals 146 has a frequency corresponding to the line-synchronizing frequency, but is displaced in phase a predetermined amount relative to the line-synchronizing signal applied across terminals 130. For the duration of each negative-polarity pulse component of the signal impressed across terminals 142, device 137 is non-conductive thus increasing the resistance component of the phase shifting network. This causes the phase of the sine-wave signal delivered to terminals 146 to be different from that during the first-described operating condition. Capacitor 147 and resistor 148 form a differentiating network for the pulse components of the signal impressed across terminals 142 so that these components have no deleterious effect on the signal derived from output terminals 146.

Therefore, during spaced operating intervals determined by the control signal from control circuit 38, the phase of the line-synchronizing signal as applied to sound modulator 33 is shifted by a preselected amount and may be considered to be effectively coded. As previously mentioned, coding device 36 is fully described and claimed in copending application Serial No. 163,223. It is to be understood that this particular coding of the line-synchronizing signal is merely illustrative. It is within the scope of the invention to employ any suitable circuit to change a characteristic of the line-synchronizing signal for coding purposes.

The clamping pulse circuit 22 is shown in detail in Figure 6 and includes a first pair of input terminals 159 which are connected to generator 16 to derive line-synchronizing pulses therefrom. Terminals 159 are connected to the primary winding 160 of a transformer 161 through a series-connected resistor 162 and capacitor 163. The secondary winding 164 of the transformer is shunted by a capacitor 165, one side of the secondary winding being connected to ground. The other side of winding 164 is coupled to ground through a phase shifting network comprising a resistor 166 and a capacitor 167, the junction of resistor 166 and capacitor 167 being coupled to the control electrode 168 of an electron-discharge device 169 through a capacitor 170. Device 169 is a blocking oscillator and its cathode 171 is connected to ground through a winding 172 of a transformer 173 and a resistor 174. The anode 175 of device 169 is connected to the positive terminal of a source of unidirectional potential 176 through a winding 177 of transformer 173.

The clamping-pulse circuit has a second pair of input terminals 178 connected to the output terminals of multivibrator 25. One of the terminals 178 is connected to ground and the other to control electrode 168 of device 169 through an adjustable resistor 180 and a resistor 181.

The junction of winding 172 and resistor 174 is coupled to the control electrode 182 of an electron-discharge device 183 through a series-connected capacitor 184 and resistor 185, the control electrode being connected to ground through a resistor 186. The cathode 187 of device 183 is directly connected to the cathode 188 of an electron-discharge device 189, these cathodes being grounded through a common cathode resistor 190. The anode 191 of device 183 is connected to the positive terminal of source 176 through a resistor 192 and is coupled to the control electrode 193 of device 189 through a capacitor 194. Control electrode 193 is connected to ground through a series-connected adjustable resistor 195 and a resistor 196, and anode 197 is connected to the positive terminal of source 176 through a resistor 198. The output terminals 199 of the clamping-pulse circuit are connected to mixer amplifier 11 by leads 23, one of these output terminals being grounded and the other connected to anode 197.

Devices 183 and 189 form a multivibrator circuit which is triggered by the output pulses from the preceding blocking oscillator. The time constant of the multivibrator may be varied by adjustment of resistor 195 in well-known manner and this resistor is adjusted to provide pulses of a desired individual duration across terminals 199.

The operation of the circuit of Figure 6 may best be understood by reference to the curves of Figure 7. Line-synchronizing pulses from generator unit 16, shown in curve L, are impressed across terminals 159 for application to primary winding 160 of transformer 161. Secondary winding 164 of the transformer is tuned to the repetition frequency of these pulses by means of capacitor 165, and consequently a sine wave is produced across the secondary winding. This sine wave is phase shifted in network 166, 167 and is applied to control electrode 168 of device 169 with a phase relation to the line-synchronizing pulses as shown in curves N and L.

Multivibrator 25 is triggered at random times by the randomly-divided field-synchronizing pulses applied thereto by frequency divider 24. This causes the multivibrator to generate a signal having negative-polarity pulse components occurring at random times. This signal is impressed across terminals 178 and is applied to control electrode 168 through resistors 180 and 181 with a wave form such as shown in curve M.

The composite signal applied to control electrode 168, shown in curve O, consists of the sine wave of curve N added to the pulse components of curve M. During the intervals between the negative-polarity pulse components of the signal of curve M, blocking oscillator 169 is triggered at a certain point, designated *x* in curve O, in each cycle of the sine wave. This point corresponds to the time the signal of curve O increases beyond the blocking oscillator triggering level which is represented by the broken line 200. The triggering point may be adjusted by variation of resistor 180, which is in the discharge path of capacitor 170 and thus determines the time constant of the oscillator. For the duration of each negative-polarity pulse component of the signal of curve M, the triggering of the blocking oscillator occurs at a point *y* in each cycle of the signal shown in curve O. That is, the triggering of the blocking oscillator is delayed by a time *t* with respect to the triggering during the intervals between the negative-polarity pulse components of the signal of curve M.

Each time the blocking oscillator is triggered, a sharp pulse appears across resistor 174 in the cathode circuit of device 169. These pulses are shown in curve P and are applied to the multivibrator circuit of devices 183, 189 which responds and applies output pulses to terminals 199 as shown in curve Q. As previously mentioned, the individual duration of each of these pulses may be adjusted by variation of resistor 195. The pulses of curve Q are applied to mixer amplifier 11 and act as clamping pulses in the television signal and their amplitude is made such that when pedestalled on the line-blanking pulses they extend to the "black" level of the video signal. Moreover, at spaced intervals determined by the pulse components of wave form M, the clamping pulses are shifted by a time interval *t* to prevent unauthorized synchronization thereon. The phase-shifting characteristic of network 166, 167 and the adjustment of the blocking oscillator triggering point are made such that the clamping pulses of curve Q are correctly timed with respect to the line-blanking pulses so that they appear pedestalled thereon in the television signal. Furthermore, resistor 180 is so adjusted that the time displacement *t* does not cause the clamping pulses to move off the line-blanking pulses during the spaced intervals when the timing of the clamping pulses is shifted.

A television receiver for use in conjunction with the transmitter of Figure 1 is shown in Figure 8. It includes a radio-frequency amplifier 210 of one or more stages connected to a first detector 211. The output terminals of of the first detector are connected to an intermediate-frequency amplifier 212 of any desired number of stages, and amplifier 212 is connected to a second detector 213. The output terminals of the second detector are connected to the input electrodes of an image-reproducing device 214 through a video amplifier and direct-current restorer 215. The input terminals of radio-frequency amplifier 210 may be connected to a suitable antenna circuit 216, 217. These components of the receiver are of well-known construction and are connected in usual fashion.

The sound components of a received television signal are separated therefrom in the output circuit of first detector 211 and applied to a sound intermediate-frequency amplifiers 218 which is selective to the frequency of these sound components. The output terminals of amplifier 218 are connected to a detector 219 which, in turn, is connected to a sound-reproducing device 220 through an audio amplifier 221. Detector 219 is connected to a filter 222 which is tuned to be selective to the frequency of the line-synchronizing signal. Filter 222 is connected to a decoding device 223 which, in turn, is connected to a line-sweep generator 224. The output termnials of generator 224 are connected to the line-deflection elements 225 of reproducing device 214.

Intermediate-frequency amplifier 212 is connected to a discriminator-detector 226 of any well-known construction, and the output terminals of detector 226 are connected to a field-sweep generator 227. Generator 227 is connected to field-deflection elements 228 associated with device 214. Detector 226 is also connected to the input terminals of a control circuit 229, this circuit having further input terminals connected to line circuit 30 extending to the transmitter and having output terminals connected to decoding device 223.

The television signal from the transmitter of Figure 1 may be intercepted by antenna circuit 216, 217 and amplified in radio-frequency amplifier 210. The amplified signal is heterodyned to the selected intermediate frequency of the receiver in first detector 211, and the resulting video intermediate-frequency signal is amplified in amplifier 212. This intermediate-frequency signal is then detected in second detector 213 and the resulting composite video signal is amplified in the video amplifier portion of unit 215. Unit 215 includes any known type of direct-current restoration circuit for effectively reinserting the low-frequency components of the video signal by stabilizing that signal on its clamping pulses. The direct-current restoration circuit is preferably gated so that it is responsive only during the intervals of the clamping pulses to preclude the possibility of the circuit acting on video-signal peaks approaching the "black" level. To accomplish this gating action, pulses having a duration corresponding to the line-retrace intervals may be derived from the line-sweep generator 224 and applied to a gating device in the direct-current restoration circuit over leads 215'. The amplified video signal from amplifier 215 is applied to the input electrodes of device 214 and controls the intensity of the cathode-ray beam therein in well-known fashion.

The video intermediate-frequency amplifier 212 may have the usual characteristics for vestigal side-band reception. In that case, any frequency shifts in the picture carrier give rise to corresponding amplitude changes in the intermediate-frequency signal derived therefrom. As previously described, the picture carrier is frequency-modulated in accordance with the field-synchronizing components. However, due to the fact that inverted-polarity field-synchronizing pulses are concurrently amplitude modulated on the field-blanking pulses as shown in curve D of Figure 2, the amplitude of the field-blanking pulses in the signal from the video intermediate-frequency amplifier does not exceed "black" level during the field-synchronizing intervals. This obviates any distortion in the reproduced image that would otherwise occur, due to the effect on the direct-current restorer of amplitudes in excess of "black" level.

The frequency-modulated field-synchronizing pulses are recovered by means of discriminator-detector 226 and are supplied to field-sweep generator 227 and to control circuit 229. These pulses are used to control the operation of the field-sweep generator in well-known fashion.

The sound components of the received television signal are amplified in sound intermediate-frequency amplifier 218 and are detected in detector 219. The resulting audio signals are amplified in amplifier 221 and are reproduced by sound-reproducing unit 220. The sine-wave line-synchronizing signal is selected from the sound components by means of filter 222 and applied to line-sweep generator 224 through coding device 223. The line-sweep generator may be constructed to respond to a sine-wave synchronizing signal in well-known fashion.

Decoding device 223 and control circuit 229 may be similar in construction to coding device 36 and control circuit 38 of Figure 1. However, since it is desired that the control circuit 229 impart a compensating change to the line-synchronizing signal translated by decoding device 223, phase-inverter circuit 113 of Figure 3 is not required. In this manner, during intervals when control circuit 38 of the transmitter supplies negative-polarity pulses to coding device 36, control circuits 29 of the receiver supplies positive-polarity pulses to decoding device 223. Field-synchronizing pulses derived from discriminator detector 226 are further applied to control circuit 229 and are used to control the operation of this control circuit in the manner similar to that described in connection with control circuit 38 of the transmitter.

Control circuit 38 at the transmitter acts to produce a phase change in the line-synchronizing signal during the field-retrace intervals following the initiation and termination of each burst of key signal on line circuit 30. Control circuit 229, acting under control of the bursts of key signal on line circuit 30 and field-synchronizing pulses derived from detector 226, impresses a compensating change to the line-synchronizing signal in time coincidence with the phase change at the transmitter. It may, therefore, be stated that the line-synchronizing signal is effectively decoded in decoding device 223.

The receiver of Figure 8, therefore, receives the television signal radiated by the transmitter of Figure 1 and utilizes the video components thereof to control the intensity of the cathode-ray beam in reproducing device 214. The frequency-modulated field-synchronizing components of the television signal are recovered by discriminator detector 226 and are utilized to control the field scansion of the reproducing device. The sound components of the received signal are detected and amplified by stages 218, 219, 221, and are reproduced by sound-reproducing device 220. The line-synchronizing signal is recovered from the sound carrier, decoded and used to control the line scansion of reproducing device 214. The receiver of Figure 8, therefore, decodes the received subscription television signal and faithfully reproduces the image and sound intelligence represented thereby.

The invention provides, therefore, an improved subscription system in which a television signal is coded with a high degree of complexity, yet one which requires relatively simple and uncomplicated apparatus at the various subscriber receivers to effect decoding. Moreover, transmitter efficiency is increased since the synchronizing components, as opposed to present-day practice, do not have amplitudes extending beyond the maximum amplitude of the video components. For this reason, there is no need for the transmitter to have peak power capabilities corresponding to those of present-day systems.

Since the scanning functions of picture-converting device 10 at the transmitter are not disturbed during the coding process, the coding of the television signal may be accomplished at some point remote from its source. That is, device 10 may be replaced by an incoming video signal derived from a remote locality in uncoded form and coded by the apparatus of Figure 1 for retransmission to the surrounding area.

While a particular embodiment of the invention has been shown and described, modifications may be made, and it is intended in the appended claims to cover all such modifications as fall within the true spirit and scope of the invention.

I claim:

1. A subscription type of television transmitter comprising: a source for supplying video signals occurring during a series of trace intervals separated by line- and field-retrace intervals; a synchronizing-signal source for producing during said retrace intervals line- and field-synchronizing signals and associated line- and field-blanking pulses related to the timing of said trace intervals; a clamping-signal source for producing clamping pulses during said line-retrace intervals; means for varying the timing of said clamping pulses within said line retrace intervals in accordance with a coding schedule; means coupled to said sources for developing a composite signal including video components, and including blanking components and pedestalled clamping components having a fixed combined amplitude corresponding to black level in said composite signal; a first unit for producing a picture-carrier wave and for amplitude-modulating said carrier in accordance with said composite signal; a sound-signal source for developing a sound signal; a second unit coupled to said sound-signal source for producing a sound-carrier wave and for modulating said sound signal on said sound carrier; coding apparatus coupled to said synchronizing-signal source for varying a timing characteristic of said line-synchronizing signal in accordance with a coding schedule different from the coding schedule of said clamping pulses to effect coding of said line-synchronizing signal; means coupled to said synchronizing-signal source and to said first unit for frequency-modulating said picture carrier in accordance with said field-synchronizing signal; and means coupled to said coding apparatus for supplying said coded line-synchronizing signal to said second unit for modulation on said sound carrier.

2. A subscription type of receiver for utilizing a coded television signal including a picture carrier having clamping components of a fixed amplitude value corresponding to black level in the television signal but with varying time displacement in accordance with a coding schedule amplitude-modulated thereon, video components amplitude-modulated thereon, and field-synchronizing components frequency-modulated thereon; and further including a sound carrier with sound components and line-synchronizing components, coded in accordance with a coding schedule different from the coding schedule of the clamping components, modulated thereon; and for further utilizing a key signal received concurrently with said television signal and indicating the coding schedule of said line-synchronizing components, said receiver comprising: an image-reproducing device and an associated scanning system; apparatus for supplying said video components to said reproducing device; a direct-current restorer circuit included in said apparatus for stabilizing said video components with respect to said clamping components; a sound-reproducing device; apparatus for supplying said sound components to said sound-reproducing device; a frequency-modulation detector coupled to said first-mentioned apparatus for selecting said field-synchronizing components from said television signal and for supplying said components to said scanning system; a filter network coupled to said second-mentioned apparatus for selecting said coded line-synchronizing components from said television signal; a decoding device coupled to said filter network for decoding said line-synchronizing components and for supplying said decoded components to said scanning system; and means for supplying said key signal to said decoding device to actuate said device in accordance with said coding schedule.

3. A subscription type of television system comprising a transmitter and a receiver, said transmitter including: a source for supplying video signals occurring during a series of trace intervals separated by retrace intervals; another source for providing clamping pulses during said retrace intervals; means for varying the timing of said clamping pulses within said retrace intervals in accordance with a coding schedule; means coupled to said sources for developing a composite signal including video components and including clamping components having a fixed amplitude value corresponding to black level in said composite signal; a first unit for producing a picture-carrier wave and for amplitude-modulating said carrier in accordance with said composite signal; a sound-signal source; a second unit coupled to said sound-signal source for producing a sound-carrier wave and for modulating said sound signal thereon; a synchronizing-signal generator for producing line- and field-synchronizing signals related to the timing of said trace intervals; means coupled to said synchronizing-signal generator for frequency-modulating said picture carrier in accordance with one of said synchronizing signals; coding apparatus coupled to said synchronizing-signal generator for varying a timing characteristic of the other of said synchronizing signals in accordance with a coding schedule different from the coding schedule of said clamping pulses to effect coding of said other synchronizing signal; and means coupled to said coding apparatus for supplying the coded synchronizing signal to said second unit for modulation on said sound carrier; said receiver comprising: an image-reproducing device and an associated scanning system; apparatus for receiving said television signal and for supplying said video components to said reproducing device; a direct-current restorer circuit included in said apparatus for stabilizing said video components with respect to said clamping components; a sound reproducing device; apparatus for supplying said sound signal to said sound-reproducing device; a frequency modulation detector coupled to said first-mentioned apparatus for selecting said one of said synchronizing signals from said television signal and for supplying said signal to said scanning system; a filter network coupled to said second-mentioned apparatus for selecting said coded synchronizing signal from said television signal; and a decoding device coupled to said filter network for decoding the coded synchronizing signal and for supplying said decoded synchronizing signal to said scanning system.

References Cited in the file of this patent

UNITED STATES PATENTS

| Number | Name | Date |
|---|---|---|
| 2,401,405 | Bedford | June 4, 1946 |
| 2,487,682 | Wendt | Nov. 8, 1949 |
| 2,510,046 | Ellett et al. | May 30, 1950 |
| 2,547,598 | Roschke | Apr. 3, 1951 |
| 2,567,539 | Aram | Sept. 11, 1951 |